Sept. 28, 1926.
E. F. RAYMOND
ROLLER BIT
Filed March 23, 1925
1,601,646
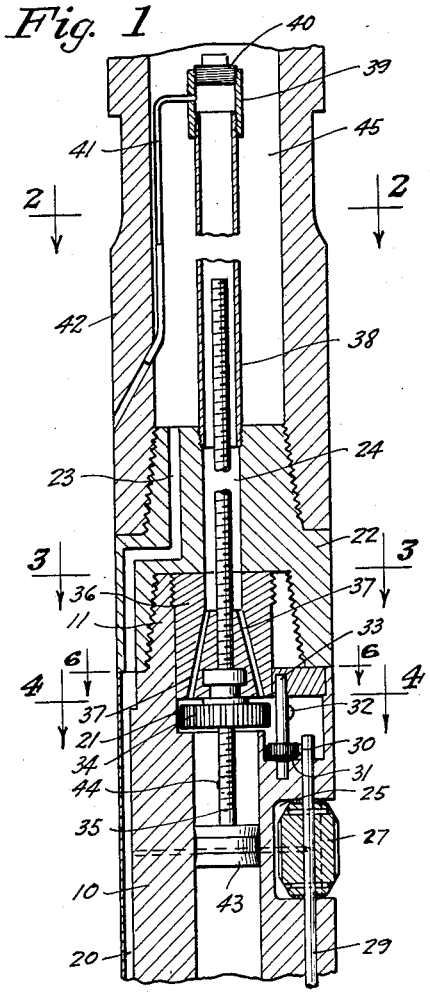
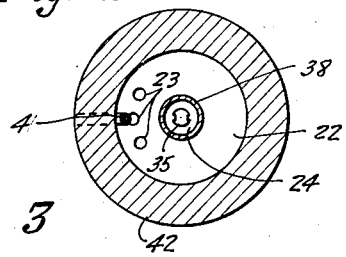
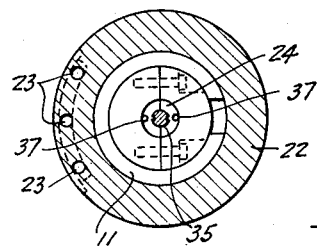
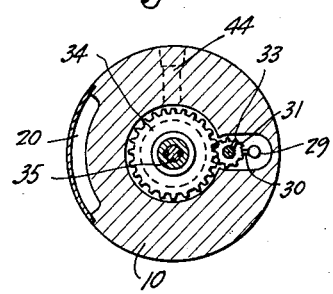
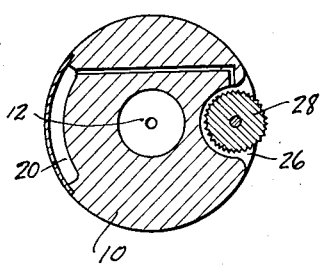
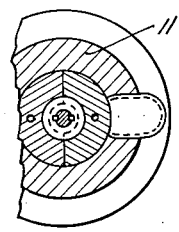
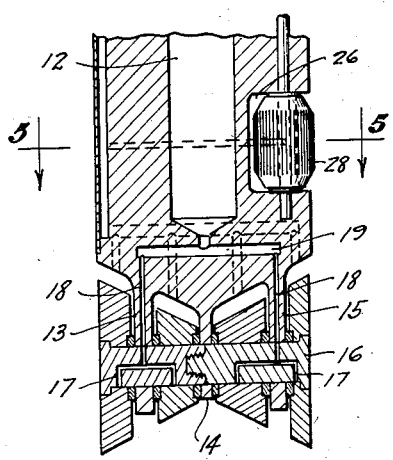
INVENTOR.
Edward F. Raymond
BY Westall and Wallace
ATTORNEYS.

Patented Sept. 28, 1926.

1,601,646

UNITED STATES PATENT OFFICE.

EDWARD F. RAYMOND, OF SANTA FE SPRINGS, CALIFORNIA.

ROLLER BIT.

Application filed March 23, 1925. Serial No. 17,581.

This invention relates to a boring tool having cutters which rotate on a head. Such tools are operated far below the surface of the ground, and during such operation are inaccessible. Lubrication of the bearings of the cutters is difficult under such circumstances. It has been attempted to supply lubricant by storing in the tool a supply thereof and feeding the supply to the bearing surfaces. Such tools operate in a hole filled with gritty circulation liquid under pressure, and to keep the circulation liquid from entering the bearings, the lubricant is maintained under pressure. Due to the depth at which the tool is operated, the supply of pressure to the lubricant independent of the circulation fluid pressure requires cumbersome expensive apparatus requiring attention of the operator. Furthermore, leakage occurs at the bearings and the lubricant in many cases is exhausted quickly, causing the bearings to run dry. The primary object of this invention is the provision of a tool of the character described having a lubricating system whereby lubricant is fed from a storage chamber to the cutters and rotating parts in an amount proportionate to the number of revolutions of the tool. Another object of this invention is to provide a tool of the character described, having a positively operated lubricant feeding system.

These objects together with other objects and corresponding accomplishments are obtained by means of the embodiment of my invention illustrated in the accompanying drawing, in which:

Fig. 1 is an axial section through a roller bit equipped with a lubricating system embodying my invention; Fig. 2 is a section as seen on the line 2—2 of Fig. 1; Fig. 3 is a section as seen on the line 3—3 of Fig. 1; Fig. 4 is a section as seen on the line 4—4 of Fig. 1; Fig. 5 is a section as seen on the line 5—5 of Fig. 1; and Fig. 6 is a section as seen on the line 6—6 of Fig. 1.

Referring more particularly to the drawing, the tool comprises a body 10 having a tapered threaded pin 11 at the top thereof.
Extending axially through the body is a bore 12 forming a lubricant supply barrel. Extending from the body are legs 13, 14 and 15, in which are journalled the rollers, in this instance having conical surfaces. The legs are so spaced, that they will not track one another upon rotation of the tool. The spindle 16 upon which the rollers are mounted is divided at the center, the sections thereof being secured together by a threaded socket and pin to provide for easy assembly of the parts. Lubricant ducts 17 open through the spindle to the bearing surfaces. These ducts register with ducts 18 in the legs which communicate with a cross-duct 19. Cross-duct 19 is in communication with the lower end of the barrel 12. The ducts are so arranged that lubricant contained within the barrel may be forced outwardly to the bearing surfaces of the rollers and spindle. Circulation fluid is supplied to the rollers from water course 20 suitably arranged in the body. However, these water courses form no part of the present invention and are not described in detail. The upper portion of bore 12 is enlarged as indicated by 21 and threaded at the upper end for receiving a closure plug. A coupling 22 has a threaded socket for engagement with the pin 11 on the body. This coupling is provided with a threaded tapered pin at the upper end and with water courses 23 communicating with the water course 20 in the body. Extending through the center of the coupling is a bore 24, it being internally threaded at the upper end.

In the sides of the body 10 are niches 25 and 26 to receive tractor rollers 27 and 28. The rollers are secured to a shaft 29 which is journalled in the body. The outer surfaces of the rollers are corrugated and so disposed that they extend a slight distance beyond the peripheral surface of the body, so that they may come in contact with the side walls of the hole during rotation of the tool. Extending from the shaft 29 is a tooth 30 arranged to engage a pinion 31 rotating the latter. Pinion 31 is mounted upon a shaft 33 journalled in the body, the shaft carrying a tooth 32 at its upper end.

The tooth 32 is disposed to engage gear teeth on a nut 34 mounted upon a threaded rod 35. A threaded member engages the thread on rod and 35 is secured to the gear 34. Rod 35 has slots in the sides to prevent rotation thereof. The rod 35, and gear 34 are mounted in a head 36 forming a closure plug for the top of the body. The plug has the bore extending therethrough enlarged at the top to register with the bore 24 in coupling 22. There are ducts 37 extending from the bore at its large portion to the lower portion of the closure plug. Mounted in the bore 24 of the coupling member and forming a housing for the rod 35 is a tubular member 38 having a cap 39 at the upper end closed by a plug 40. Cap 39 has a tube 41 communicating therewith and extending downwardly opening to the outside of a collar 42. Mounted upon the end of stem 35 is a piston 43. To prepare the tool for use, piston 43 is retracted to the top of the bore, and the barrel filled with grease which may be conveniently done through opening 44. The tool is attached to the drill pipe and lowered into the hole. Circulation fluid may be passed through the bore 45 in collar 42, and then downwardly through the water courses to the tool, and also to the surfaces of the tractor rollers 27 and 28. The circulation fluid passes upwardly and may enter the tubing 41 and pass into the casing 38. This casing may be partially filled with lubricant for lubricating the stem 35 and the gears, pinions, shafts and other parts intermediate the tractor roller shaft 29 and stem 35. The pressure of the circulation liquid on top of the lubricant in tubular casing 38, will insure lubricant reaching the rotating parts. Rotation of the tool causes the rollers to ride against the side wall of the hole and to be rotated thereby. These rollers may also act as reamers. There is a great reduction in speed between the rollers and the gear 34. Rotation of gear 34 causes the piston rod 35 to be moved downwardly, and with it the piston 43. The ultimate result is that lubricant below the piston is slowly forced outwardly through the ducts to the bearing surfaces on the spindle, thereby lubricating the rollers.

What I claim is:

1. A boring drill comprising a body having rotatable cutters mounted in bearings in said body, there being in said body a lubricant barrel and lubricant ducts leading therefrom to said bearings, a piston in said barrel, means operable by rotation of said drill to move said piston and force lubricant from said barrel characterized by said means comprising a piston rod provided with a screw thread, a nut mounted thereon and held against axial movement, a rotatable tractor element arranged to engage a wall of the hole being drilled, and gearing for transmitting motion from said element to said nut whereby rotation of said tractor element will cause said piston to be moved.

2. A boring drill comprising a body having rotatable cutters mounted in bearings in said body, there being in said body a lubricant barrel and lubricant ducts leading therefrom to said bearings, a piston in said barrel, means operable by rotation of said drill to move said piston and force lubricant from said barrel, characterized by said means comprising a piston rod provided with a screw thread, a nut mounted thereon and held against axial movement, a tractor roller disposed in the periphery of said body so as to engage the side wall of the hole, and gearing for transmitting motion from said roller to said nut to cause said piston to be moved.

3. A boring drill comprising a body having rotatable cutters mounted in bearings in said body, there being in said body a lubricant barrel and lubricant ducts leading therefrom to said bearings, a head for said barrel, a piston in said barrel, a piston rod provided with a screw thread secured to said piston, a nut on said rod rotatably mounted in said head so as to be held against axial movement, said nut being provided with gear teeth, a lubricant case capping said piston rod, there being ducts in said body leading from said case to the barrel above said piston and the passages connecting said case with the circulation fluid in the hole being drilled so as to permit ingress of said fluid to said case, and means operable by rotation of said drill to move said piston and force lubricant from said barrel.

4. A boring drill as specified in claim 3 characterized by said means comprising a rotatable tractor element arranged to engage the wall of the hole being drilled, and gearing for transmitting motion therefrom to said piston.

5. A boring drill as specified in claim 3 characterized by said means comprising a tractor roller disposed in the periphery of said body so as to engage the side wall of the hole, and gearing for transmitting motion therefrom to said piston.

In witness that I claim the foregoing I have hereunto subscribed my name this 17th day of March, 1925.

EDWARD F. RAYMOND.